United States Patent
Appleton

(10) Patent No.: US 9,453,420 B2
(45) Date of Patent: Sep. 27, 2016

(54) CORE FOR A COMPOSITE STRUCTURE AND METHOD OF FABRICATION THEREOF

(75) Inventor: Steve Appleton, Fleet (GB)

(73) Assignee: Vestas Wind Systems A/S, Aarhus N. (DK)

( * ) Notice: Subject to any disclaimer, the term of this patent is extended or adjusted under 35 U.S.C. 154(b) by 774 days.

(21) Appl. No.: 13/881,917

(22) PCT Filed: Oct. 25, 2011

(86) PCT No.: PCT/GB2011/052067
§ 371 (c)(1),
(2), (4) Date: Jul. 23, 2013

(87) PCT Pub. No.: WO2012/056226
PCT Pub. Date: May 3, 2012

(65) Prior Publication Data
US 2013/0294925 A1   Nov. 7, 2013

(30) Foreign Application Priority Data

Oct. 26, 2010  (GB) .................................. 1018081.8

(51) Int. Cl.
*F03D 11/00*   (2006.01)
*F01D 5/28*    (2006.01)
(Continued)

(52) U.S. Cl.
CPC ............. *F01D 5/282* (2013.01); *B29C 70/086* (2013.01); *B29C 70/86* (2013.01); *B29C 70/882* (2013.01); *B29D 99/0028* (2013.01); *F03D 1/065* (2013.01); *H01Q 15/148* (2013.01); *H01Q 17/007* (2013.01); *H01Q 17/008* (2013.01); *B29L 2031/085* (2013.01); *B32B 38/1866* (2013.01); *B32B 2309/105* (2013.01);
(Continued)

(58) Field of Classification Search
CPC .. F03D 1/0675; F03D 11/00; F03D 11/0041; F01D 5/282; F05B 2260/99; F05B 2280/6012
See application file for complete search history.

(56) References Cited

U.S. PATENT DOCUMENTS

| 4,479,994 A | 10/1984 | Berg |
| 5,160,785 A * | 11/1992 | Davidson, Jr. ....... A47C 27/146 |
| | | 297/DIG. 1 |

(Continued)

FOREIGN PATENT DOCUMENTS

| EP | 0993071 A2 | 4/2000 |
| GB | 2434251 A | 7/2007 |

(Continued)

OTHER PUBLICATIONS

International Bureau, International Preliminary Report on Patentability issued in corresponding International Application No. PCT/GB2011/052067 dated Apr. 30, 2013, 8 pages.

(Continued)

*Primary Examiner* — Ninh H Nguyen
(74) *Attorney, Agent, or Firm* — Wood, Herron & Evans, LLP

(57) ABSTRACT

A flexible core for a composite structure is described. The core includes a first core layer, a second core layer, and a ground plane between the first and second core layers. A plurality of slits is provided in the core, and each slit extends through one of the first of second core layers and through the ground plane. The core may be the core of a sandwich panel, for example a sandwich panel of the type used in the composite construction of wind turbine blades.

21 Claims, 7 Drawing Sheets

(51) Int. Cl.
*B29C 70/08* (2006.01)
*B29C 70/86* (2006.01)
*B29C 70/88* (2006.01)
*B29D 99/00* (2010.01)
*F03D 1/06* (2006.01)
*H01Q 17/00* (2006.01)
*H01Q 15/14* (2006.01)
*B29L 31/08* (2006.01)
*B32B 38/18* (2006.01)

(52) U.S. Cl.
CPC .......... *F05B2260/99* (2013.01); *Y02E 10/721* (2013.01); *Y02P 70/523* (2015.11); *Y10T 428/24314* (2015.01)

(56) References Cited

U.S. PATENT DOCUMENTS

| | | | | |
|---|---|---|---|---|
| 5,567,660 | A * | 10/1996 | Chen | H01L 21/02126 257/E21.26 |
| 6,418,007 | B1 * | 7/2002 | Lacy | H01G 4/255 361/301.1 |
| 6,873,031 | B2 * | 3/2005 | McFadden | H05K 9/0083 257/659 |
| 7,045,702 | B2 * | 5/2006 | Kashyap | F03D 9/007 136/244 |
| 8,294,535 | B2 * | 10/2012 | Feiertag | H03H 9/059 29/25.35 |
| 8,299,927 | B2 * | 10/2012 | Lawrence | G06K 19/07 340/572.1 |
| 8,319,097 | B2 * | 11/2012 | Luch | H01L 31/0465 136/251 |

FOREIGN PATENT DOCUMENTS

| | | |
|---|---|---|
| WO | 2006010342 A1 | 2/2006 |
| WO | 2009003476 A1 | 8/2009 |
| WO | 2010122351 A2 | 10/2010 |
| WO | 2010122352 A2 | 10/2010 |

OTHER PUBLICATIONS

Intellectual Property Office, Combined Search and Examination Report issued in corresponding GB Patent Application No. GB1018081.8 dated Feb. 25, 2011, 7 pages.

International Searching Authority, Search Report and Written Opinion issued in corresponding International Application No. PCT/GB2011/052067 Jan. 27, 2012, 13 pages.

Office Action issued by the European Patent Office in corresponding European Application No. 11784749.1 on May 26, 2014 (5 pages).

* cited by examiner

US 9,453,420 B2

1

CORE FOR A COMPOSITE STRUCTURE AND METHOD OF FABRICATION THEREOF

FIELD OF THE INVENTION

The present invention relates to radar absorbing materials (RAM) used in the construction of composite structures such as wind turbine blades. In particular, the present invention relates to sandwich panel cores incorporating RAM, and to composite structures incorporating such cores.

BACKGROUND

It is desirable to introduce radar absorbing material (RAM) into composite structures such as wind turbine components, for example wind turbine blades. One reason for this is that rotating blades have a radar signature similar to that of aircraft, which can make it difficult for air traffic control and other radar operators to distinguish between aircraft and wind turbines. Incorporating RAM into such structures ensures that the resulting structure has a reduced radar signature that can be distinguished easily from aircraft, and which creates less unwanted events (also known as "clutter") on the screen of the radar operator.

Existing wind turbine blades are generally manufactured from reinforced composite materials. A typical blade is fabricated in two shells, which are subsequently united to form a single hollow unit. The shells include at particular locations sandwich panel regions having a core of lightweight material such as foam or balsa wood.

By way of background, FIG. 1 shows a cross section of a wind turbine blade 10. The blade 10 is constructed from two aerodynamic shells, upper shell 11 and lower shell 12 which are formed from a glass fibre cloth and resin composite. The shells 11 and 12 are supported by a tubular structural spar 13 formed from glass fibre and carbon fibre.

The spar 13 forms the primary strengthening structure of the blade 10. At the rear of each shell 11 and 12 towards the trailing edge of the blade 10, the shells are formed with a sandwich panel construction, in which a foam core 14 is positioned between sheets or "skins" of glass fibre 15 and 16. The foam core 14 is used to separate the glass fibre skins 15 and 16 to keep the shell stiff in this region.

FIG. 2 shows an exploded sectional perspective view of part of a sandwich panel region of the blade 10. The sandwich panel comprises the foam core 14, which has an inner surface 17 and an outer surface 18. The core 14 is disposed between the inner skin 16 and the outer skin 15. The outer surface 18 of the core 14 and the outer skin 15 face towards an exterior surface 19 (FIG. 1) of the blade 10, whilst the inner surface 17 of the core 14 and the inner skin 16 face towards an interior region 20 (FIG. 1) of the blade 10.

Referring still to FIG. 2, an impedance layer 21 is provided on the outer skin 15, and a conductive ground plane 22, which functions as a radar reflecting layer, is provided between the core 14 and the inner skin 16. The foam core 14 serves as a dielectric layer between the ground plane 22 and the impedance layer 21.

In this example, the impedance layer 21 is a "circuit analogue" (CA) layer, which comprises a carbon-ink circuit printed on an inner surface 23 of the outer skin 15. The carbon-ink circuit is represented by the array of dashes in FIG. 2. For the avoidance of doubt, the outer skin 15 has been made transparent in FIG. 2 so that the CA layer 21 can be seen; in reality, the CA layer 21 would not be visible through the outer skin 15. The CA layer 21 forms a radar

2 absorbing circuit in combination with the ground plane 22. When radar waves are incident upon the blade 10, the combination of the CA layer 21 and the ground plane 22 act to absorb the radar waves so that they are not reflected back to the radar source. In other examples, an otherwise resistive layer may be used in place of the CA layer 21.

Different regions of a wind turbine blade are subject to different forces. Consequently, sandwich panels at different locations within the blade structure may require different core thicknesses. Typically, the core thickness ranges from 5 mm to 45 mm.

The separation between the impedance layer 21 and the ground plane 22 is a key parameter for radar absorption performance, and must be carefully controlled to achieve a blade 10 having the desired absorption properties. Such careful control of the separation of these layers is made more difficult by the varying geometry of the blade 10, specifically the abovementioned variation in core thickness. Theoretical calculations and experimental trials have shown that sandwich panels having a core thickness between approximately 35 mm to 45 mm cannot be turned into high performance RAM using CA or resistive layers and a ground plane arranged as shown in FIG. 2.

A split core arrangement that provides consistent radar absorption performance in structures where core thickness varies is described in WO2010/122351 and WO2010/122352. The split core divides the thickness of the core between inner and outer core layers disposed about an intermediate ground plane. An example of such a split core, and its incorporation within a wind turbine blade, will now be described briefly by way of background to the present invention, with reference to FIGS. 3A to 3C.

FIG. 3A is a plan view of a wind turbine blade 30 of sandwich panel construction and incorporating a split core; FIG. 3B is an enlarged sectional view of a region close to the root 32 of the blade 30, at which point the sandwich panel has a relatively thick core 34; and FIG. 3C is an enlarged sectional view of a region close to the tip 36 of the blade 30, at which point the sandwich panel has a relatively thin core 38.

Referring to FIGS. 3B and 3C, the split core 34, 38 comprises inner and outer core layers 40 and 42 respectively. A ground plane 44 in the form of a layer of carbon veil is located between the inner and outer core layers 40, 42, and the three layers 40, 42, 44 are bonded together by a suitable adhesive. The split core 34, 38 is disposed inboard of a CA impedance layer 46, which is provided on an outer skin 48 of the blade 30.

The thickness of the outer core layer 42, which defines the separation between the impedance layer 46 and the ground plane 44 is the same in both FIGS. 3B and 3C, whilst the thickness of the inner core layer 40 is different. The inner core layer 40 is thicker in FIG. 3B, i.e. closer to the hub 50, than in FIG. 3C, i.e. closer to the tip 36. Since the thickness of the outer core layer 42 remains uniform across the blade 30, a single design of CA layer 46 may conveniently be utilised across the blade 30 providing that the composition of the outer skin 48 is substantially constant across the blade 30. The thickness of the inner core layer 40 does not affect RAM performance, and so this may be chosen to provide the required overall core thickness of the sandwich panel in accordance with the structural requirements of the blade 30 at the specific location of the sandwich panel within the composite structure.

Sandwich panel cores may include a chamfer along one or more edges to avoid stress concentrations from occurring in a laminate structure. The radar absorption performance of single-core arrangements, such as that shown in FIG. 2, tends to be impaired at core chamfers, whereas split-core arrangements, such as those shown in FIGS. 3B and 3C, perform considerably better for reasons that will now be described with reference to FIGS. 4A and 4B.

FIG. 4A shows a chamfered single-layer core 14 of the type shown in FIG. 2, having a thickness of 30 mm and being disposed between an impedance layer 21 and a ground plane 22. FIG. 4B shows a chamfered split core 34, 38 of the type shown in FIGS. 3B and 3C, having an inner core layer 40 that is 20 mm thick and an outer core layer 42 that is 10 mm thick. A ground plane 44 is embedded within the split core 34, 38, between the inner and outer core layers 40, 42, and the split core 34, 38 is located adjacent an impedance layer 46 such that the outer core layer 42 is between the impedance layer 46 and the ground plane 44.

Generally, a reduction in radar absorption performance occurs when the distance between the impedance layer 21, 46 and the ground plane 22, 44 changes from the distance for which the RAM is optimised. In the case of the single-layer core 14 of FIG. 4A, the separation between the impedance layer 21 and the ground plane 22 changes along the entire length of the core chamfer, i.e. between points a and c on FIG. 3A. However, in the case of the split core of FIG. 4B, the separation between the impedance layer 46 and the ground plane 44 remains constant along the majority of the length of the chamfer, i.e. between points b and c in FIG. 4B. The ground plane 44 terminates at point b, so performance is reduced only at the extreme end of the chamfer, i.e. between points a and b in FIG. 4B, rather than along the entire length of the chamfer, i.e. between points a and c, as is the case for the core 14 in FIG. 4A.

Referring again to FIGS. 3B and 3C, it should be noted that the split core 34, 38 includes several parallel slits: a first plurality of slits 52 is provided in the inner core layer 40 and a second plurality of slits 54 is provided in the outer core layer 42. These slits 52, 54 increase the flexibility of the core 34, 38 and enable the core 34, 38 to drape to conform to the required curvature of the blade shell. To avoid disrupting RAM performance, the slits 52, 54 do not penetrate the ground plane 44. To this end, each slit 52, 54 stops short of the ground plane 44.

Whilst the split cores 34, 38 described above perform well in most cases, in certain situations, for example where high drape is required, these cores have been found to be too rigid. This is due to the rigidity imparted to the core 34, 38 by the embedded ground plane 44 and the adhesive layers that bond the ground plane 44 to the respective core layers 40, 42.

Against this background, it is an object of the present invention to provide a more flexible core capable of consistent RAM performance across a wide range of core thicknesses, including relatively thick cores.

SUMMARY OF THE INVENTION

The present invention provides a core for a composite structure, the core comprising: a first core layer; a second core layer; and a ground plane between the first and second core layers; wherein a plurality of slits is provided in the core, and each slit extends through one of the first or second core layers and through the ground plane.

Notably, the slits in the split-core of the present invention penetrate the ground plane. In addition, the slits may penetrate any adhesive layers that are used to bond the various layers together. This results in a unitary split core that is more flexible than the split cores described above by way of background. Hence, the split core of the present invention is suitable for incorporation into regions of composite structures where a high level of drape is required.

Whilst it was previously thought that penetrating the ground plane would impair its performance as a RAM reflector, it has now been realised that having a discontinuous ground plane does not necessarily result in impaired performance. For example, through suitable choice of the slit sizes and positions, the ground plane can form a frequency selective surface (FSS) optimised to reflect radar waves of a particular frequency.

Aside from providing a more flexible core and a FSS, another advantage of the discontinuous ground plane is that it does not interfere with lightning protection systems, which are commonly found in modern wind turbine blades. Prior art ground planes comprise a continuous layer of conductive material, such as carbon. This tends to reduce the electric field around the lightning receptors in wind turbine blades, which can impair the performance of the receptors and may ultimately lead to the blades sustaining damage from a lightning strike. The slits through the ground plane in the present invention interrupt the conductivity of the ground plane. Experimental tests have shown that the interrupted ground plane of the present invention does not reduce or otherwise interfere with the electric field around lightning receptors in the same way as continuous conductive ground planes. Hence the cores of the present invention are more compatible with lightning protection system.

It should be appreciated that improved compatibility with lightning protection systems is not limited to multi-layer cores. For example, a discontinuous ground plane may be used in combination with a single layer of core material. For example, such a core may comprise a single layer of core material and a ground plane, wherein the ground plane includes a plurality of slits. The ground plane is preferably a layer of carbon, for example carbon veil. The core material itself may optionally include a plurality of slits to facilitate draping. Accordingly the present invention also provided a composite structure of sandwich panel construction comprising a core and a ground plane, wherein a plurality of slits is provided in the ground plane.

The present invention also provides a composite structure including a core as defined above. The composite structure may be of sandwich panel construction, in which the core is the sandwich panel core. In examples of the invention described herein, the composite structure forms part of a wind turbine blade.

Accordingly, within the same inventive concept there is provided a wind turbine blade of sandwich panel construction, in which a core of the sandwich panel comprises a first core layer; a second core layer; and a ground plane between the first and second core layers; wherein a plurality of slits is provided in the core, and each slit extends through one of the first or second core layers and through the ground plane.

It will of course be readily apparent that the present invention is not only applicable to wind turbine blades, but may also be applicable to any composite structure.

The ground plane may comprise a layer of carbon, for example carbon tissue or "carbon veil". Typically the thickness of the carbon layer is less than one millimeter. Alternatively, the ground plane may comprise electrically conductive foam, for example foam that includes particles of electrically conductive material such as metal or carbon particles.

The core layers are preferably made from a lightweight dielectric material. Suitable materials include open or closed cell structured foam, syntactic foam, balsa wood and composite honeycomb. The core is preferably of unitary construction. Preferably the core is prefabricated such that the ground plane is embedded within the core prior to fabrication of the composite structure.

Within the inventive concept there is provided a method of manufacturing a core for a composite structure, the method comprising bonding a ground plane between first and second core layers to form a unitary split-core structure, and forming a plurality of slits in the core so that each slit extends through one of the first or second core layers and through the ground plane.

An impedance layer, for example a CA layer or a resistive layer, may be provided on an outer surface of the first core layer. Alternatively, the core may be arranged close to an impedance layer in the composite structure with the first core layer being between the ground plane and the impedance layer. For example an impedance layer may be embedded within the composite structure. This may be achieved, for example, by providing a CA circuit on a layer of glass-fibre fabric prior to incorporating the fabric into a laminate composite structure.

The total thickness of the core can be varied by varying the thickness of the second core layer without varying the thickness of the first core layer. Accordingly, the thickness of the second core layer may vary across the composite structure to vary the overall thickness of the core. As the thickness of the first core layer remains the same for all core thicknesses, consistent radar absorption performance can be achieved across an entire composite structure. Furthermore RAM design is less constrained by pre-determined core thicknesses. Functionality is improved because the split core design has consistent RAM performance across all core thicknesses.

The core may be used in prepreg or resin infusion moulding, or in other compatible moulding schemes. For application in a wind turbine blade, the thickness of the first core layer is typically in the range of 10 to 15 mm and the thickness of the second core layer is typically in the range of 5 to 35 mm. These thicknesses are suitable for absorbing aviation radar signals in the 1 to 3 gigahertz (GHz) range. However, it will be appreciated that different thicknesses may be required in order to absorb higher or lower frequencies. The split core design enables RAM to be incorporated in relatively thick cores, where using a single-layer core of equivalent thickness would result in poor RAM performance.

The slits facilitate draping of the core to conform to the required curvature of the composite structure. Increased flexibility/drapability may be achieved by having slits that also extend at least partially through the other of the first or second core layers. The slits may be provided with or without removal of material from the core layers.

The slits may have a V-shaped cross section (also referred to herein as a "V-section") or a cross-section that otherwise tapers inwards towards the ground plane. This may be desirable for preventing excessive resin ingress for a given drapability. For example, the movement capability of a V-section slit is similar to the movement capability of a parallel-sided slit having a slit opening of equivalent size. However, the volume of the V-section slit will be lower than the parallel-sided slit and so resin ingress is lower in the V-shaped slit whilst drapability of the core is similar.

The core may be of unitary construction, and may be in the form of discrete panels or sheets. The edges of the panels or sheets may be chamfered to provide chamfered joints between panels. Benefits of the chamfered edges are particularly acute when there is high drape. The split core design of the present invention results in improved RAM performance at core chamfers when compared to prior art single-layer cores, as described above with reference to FIGS. 4A and 4B.

Parallel slits may be provided in the core layers to facilitate draping in a single direction. Alternatively, the slits may intersect with one another, for example in a criss-cross pattern, to facilitate draping in more than one direction.

The inventive concept also includes a wind turbine having such a blade, and a wind farm comprising one or more such wind turbines.

BRIEF DESCRIPTION OF THE DRAWINGS

Reference has already been made to FIGS. 1 to 4 of the accompanying drawings in which.

Figure 5A:
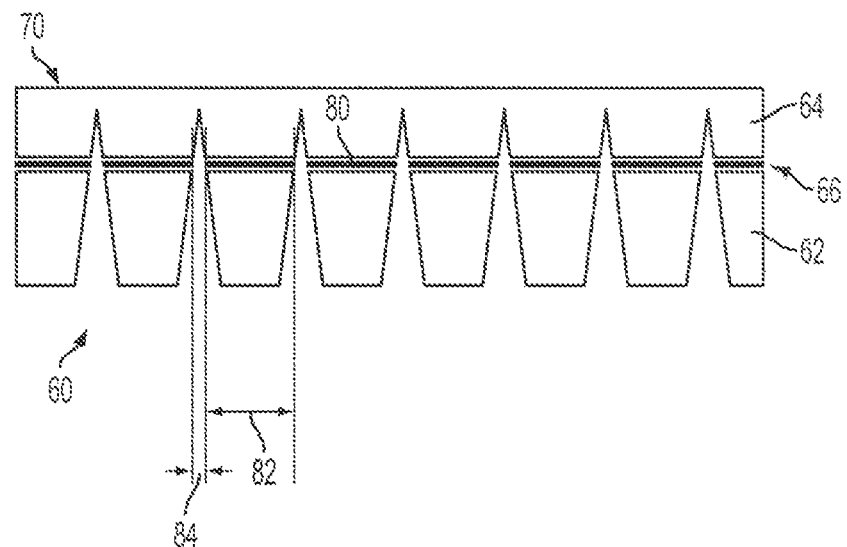
Figure 5B:
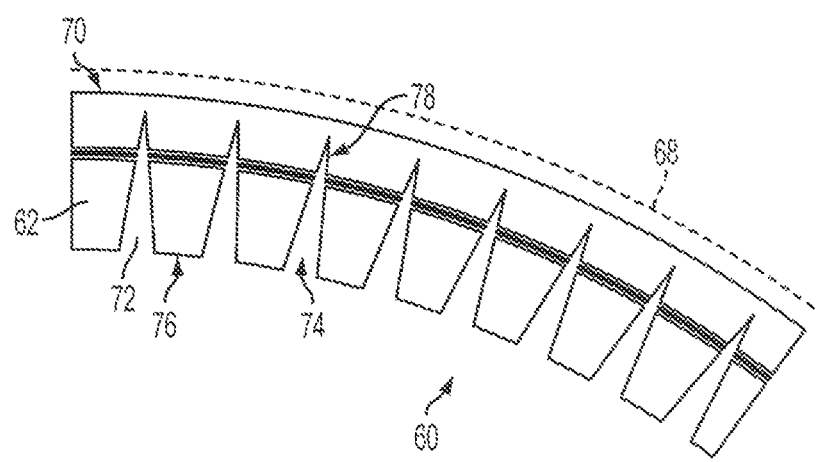
Figure 6A:
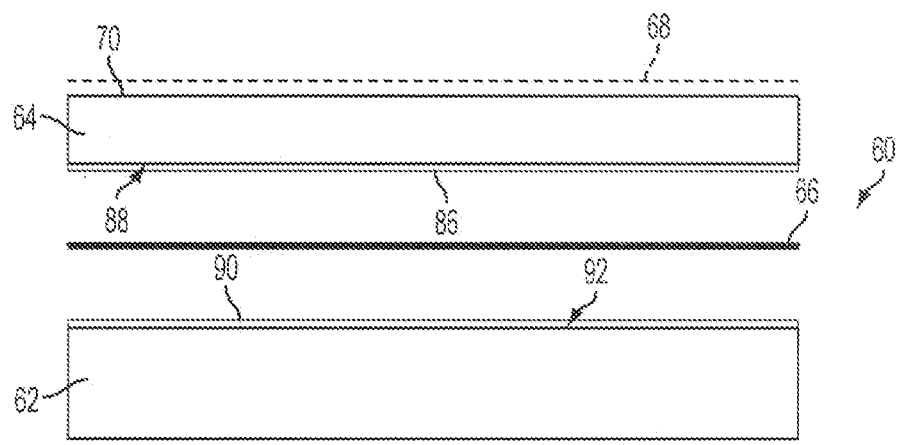
Figure 6B:
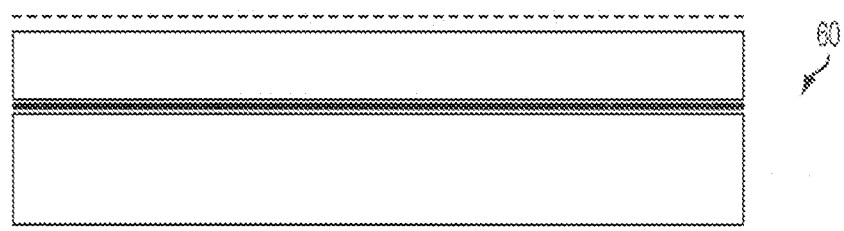
Figure 6C:
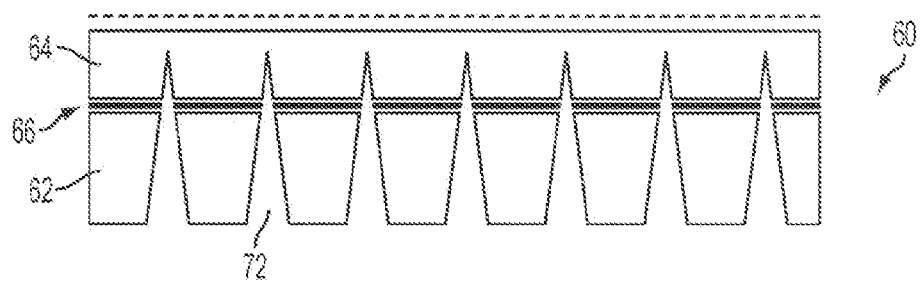
Figure 7:
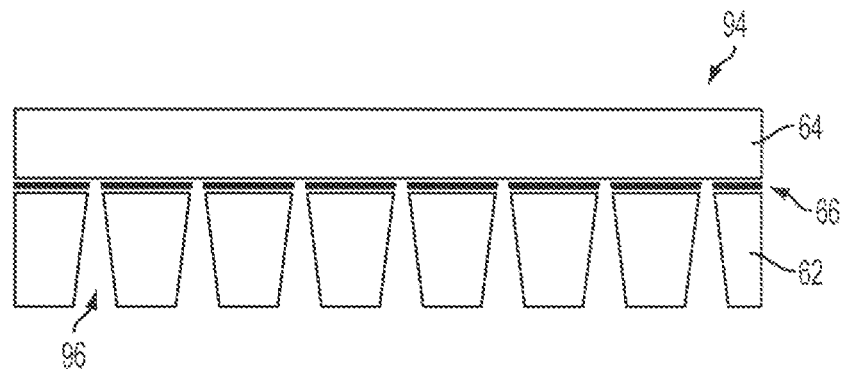
Figure 8:
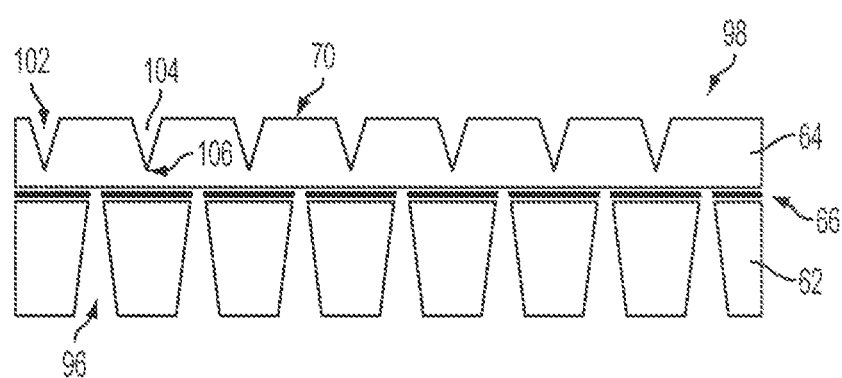
Figure 9:
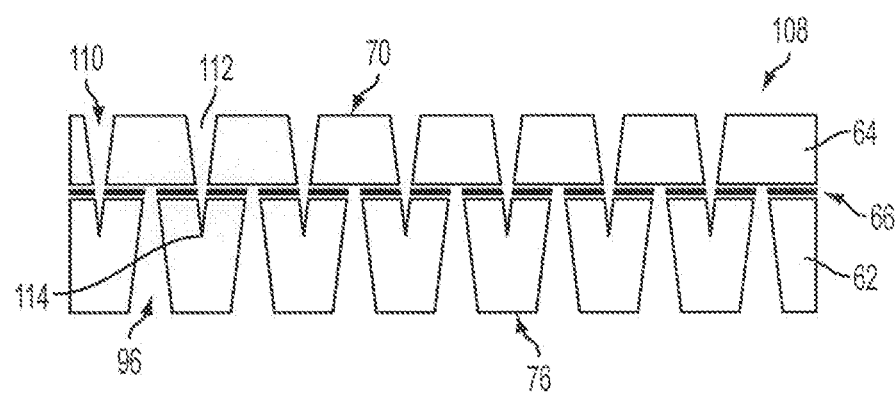
Figure 10:
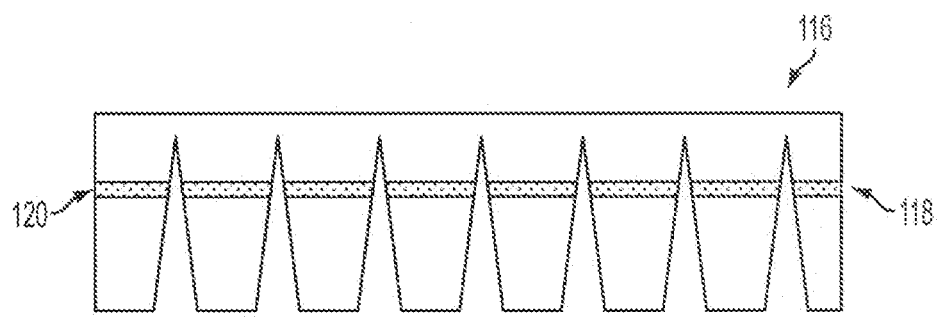

In order that the present invention may be more readily understood, reference will now be made, by way of example, to FIGS. 5 to 10, in which:

FIG. 5A is a schematic cross-sectional side view of a split core in accordance with a first embodiment of the present invention;

FIG. 5B shows the split-core of FIG. 5A in a draped configuration;

FIGS. 6A-6C show the stages involved in manufacturing the split core of FIGS. 5A and 5B;

FIG. 7 is a schematic cross-sectional side view of a split core in accordance with a second embodiment of the present invention;

FIG. 8 is a schematic cross-sectional side view of a split core in accordance with a third embodiment of the present invention;

FIG. 9 is a schematic cross-sectional side view of a split core in accordance with a fourth embodiment of the present invention; and FIG. 10 is a schematic cross-sectional side view of a split core in accordance with a fifth embodiment of the present invention.

DETAILED DESCRIPTION

FIG. 5A shows a split core 60 in accordance with a first embodiment of the present invention for use in the construction of composite structures such as wind turbine blades. The split core 60 is of unitary construction and comprises an inner core layer 62 and an outer core layer 64, each made of polyethylene terephthalate (PET) or polyvinyl chloride (PVC) foam. A layer of carbon cloth 66, also known as 'carbon veil' is disposed between the inner and outer core layers 62, 64. The three layers 62, 64, 66 are bonded together by a suitable adhesive such that the carbon layer 66 is embedded within the resulting core 60. The embedded carbon layer 66 serves as a conductive ground plane.

Referring to FIG. 5B, the split core 60 is shown disposed inboard of an impedance layer 68. The impedance layer 68 is a circuit analogue (CA) layer, which comprises a carbon-ink circuit provided on a layer of plain weave E-glass. The impedance layer 68 is disposed close to an external surface (not shown) of the composite structure. In other examples, the impedance layer 68 may be provided on an outer surface 70 of the outer core layer 64, for example as described in WO2011/024009. The combination of the CA layer 68 and the conductive ground plane 66 act to absorb incoming radar signals in a manner known in the art, so that these signals are not reflected back to the radar source, or are at least greatly attenuated.

The split core 60 in FIG. 5B is shown in a draped configuration in order to conform to the required curvature of the composite structure in which it is incorporated. That curvature is defined by the curvature of a mould (not shown) in which the split core 60 is laid up during fabrication of the composite structure. To promote draping, a plurality of V-section slits 72 is provided in the split core 60. Each slit 72 tapers inwardly from an open end 74 at an inner surface 76 of the inner core layer 62 to a closed end 78 that is within the outer core layer 64 and spaced apart from the outer surface 70 of the outer core layer 64. In this way, each slit 72 extends through the entire thickness of the inner core layer 62 and the ground plane 66, and extends part way through the outer core layer 64.

Notably, the slits 72 penetrate the carbon layer 66 and the adhesive layers that bond the various layers 62, 64, 66 together. This results in a unitary split core 60 that is more flexible than the split cores 60 described in WO2010/122351 and WO2010/122352. Hence, this split core 60 is suitable for incorporation into regions of composite structures where a high level of drape is required, i.e. in regions of high curvature.

Referring again to FIG. 5A, the carbon layer 66 defining the ground plane comprises a series of adjacent strips 80 of carbon veil. In this example the dimensions of the slits 72, and the spacings between slits 72, are chosen such that each carbon strip 80 has a width of approximately 40 mm, as represented by arrow 82, and such that the separation between adjacent carbon strips 80 is approximately 2-3 mm, as indicated by the arrows 84. This configuration of slits 72 results in a frequency selective surface (FSS) that acts as an efficient reflector of radar waves having a frequency of 3 GHz, which is typical of air-traffic control radar.

A method of manufacturing a split core 60 in accordance with the present invention will now be described with reference to FIGS. 6A to 6C. Referring first to FIG. 6A, in this example the CA layer 68 is provided on the outer surface 70 of the outer core layer 64 in accordance with the techniques described in WO2011/024009. A first adhesive layer 86 is provided on an inner surface 88 of the outer core layer 64, and a second adhesive layer 90 is provided on an outer surface 92 of the inner core layer 62. Next, the carbon layer 66 is adhered between the inner and outer core layers 62, 64 to form a unitary split core structure as shown in FIG. 6B. Following this, the plurality of V-section slits 72 are cut through the unitary core structure as shown in FIG. 6C. Conveniently, a single cut through the inner core layer 62, the carbon layer 66 and the outer core layer 64 is used to make each slit 72. Multiple cutting elements may be used to cut the various slits 72 simultaneously, for example using a plurality of circular saw blades.

FIG. 7 shows a split core 94 in accordance with a second embodiment of the present invention. A plurality of V-section slits 96 is provided in the split core 94. Each slit 96 extends through the entire thickness of the inner core layer 62 and through the entire thickness of the ground plane 66. However, in contrast to the core 60 of the first embodiment, the slits 96 do not penetrate or otherwise extend into the outer core layer 64; instead, the slits 96 stop short of the outer core layer 64.

FIG. 8 shows a split core 98 in accordance with a third embodiment of the present invention. In common with the second embodiment shown in FIG. 7, the split core 98 includes a first plurality of slits 96 that each extend through the entire thickness of the inner core layer 62 and through the entire thickness of the ground plane 66, but stop short of the outer core layer 64. To increase the drapability of the core 98, a second plurality of V-section slits 102 is provided in the outer core layer 64. Each of the second plurality of slits 102 tapers inwardly from an open end 104 at the outer surface 70 of the outer core layer 64, to a closed end 106 that is within the outer core layer 64 but spaced apart from the outer surface 70. Hence, the slits 102 do not penetrate or otherwise extend into the ground plane 66 or the inner core layer 62.

FIG. 9 shows a split core 108 in accordance with a fourth embodiment of the present invention. In common with the second and third embodiments shown in FIGS. 7 and 8 respectively, the core 108 includes a first plurality of slits 96 that each extend through the entire thickness of the inner core layer 62 and through the entire thickness of the ground plane 66, but stop short of the outer core layer 64. The core 108 also includes a second plurality of V-section slits 110, each of which tapers inwardly from an open end 112 at the outer surface 70 of the outer core layer 64 to a closed end 114 that is within the inner core layer 64 but spaced apart from the inner surface 76 of the inner core layer 62. In this way, each slit 110 extends through the entire thickness of the outer core layer 64, through the entire thickness of the ground plane 66, and part way through the inner core layer 64.

It will be appreciated that further embodiments of the invention may combine a first plurality of slits 72 of the type shown in FIG. 5A, with a second plurality of slits 102 or 110 of the type shown in FIG. 8 or 9 respectively. Other combinations of slits are also possible. For example the slits may be inverted, such that where a slit is shown having an open end in one core layer, that slit may be inverted in other examples such that its open end is in the other core layer.

FIG. 10 shows a split core 116 in accordance with a fifth embodiment of the present invention. This embodiment is similar to the first embodiment shown in FIG. 5A, however in this embodiment the carbon layer 66 has been replaced with a layer of PET of PVC foam 118 impregnated with particles of carbon material. This 'carbon-loaded' foam layer 118 is electrically conductive and serves as a ground plane, with reflection of radar signals occurring at the interface 120 between the carbon-loaded foam layer 118 and the outer core layer 64.

Figure 1:
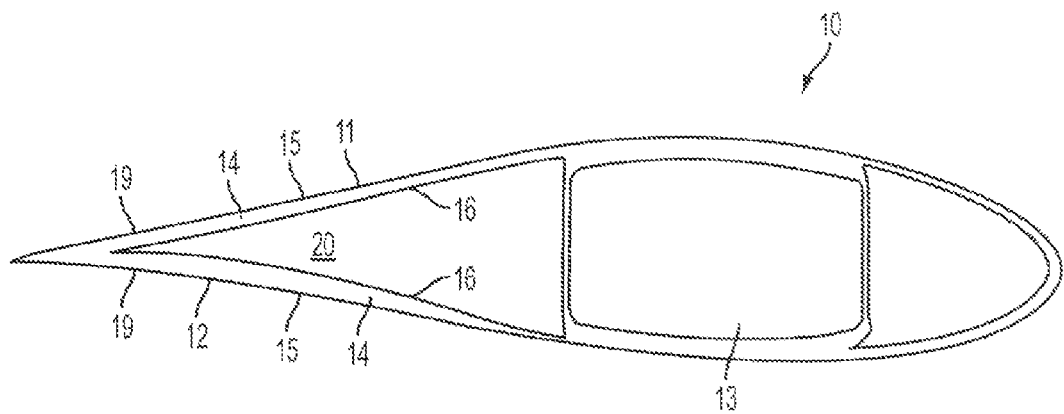
FIG. 1 is a cross section of a wind turbine blade of sandwich panel construction.
Figure 2:
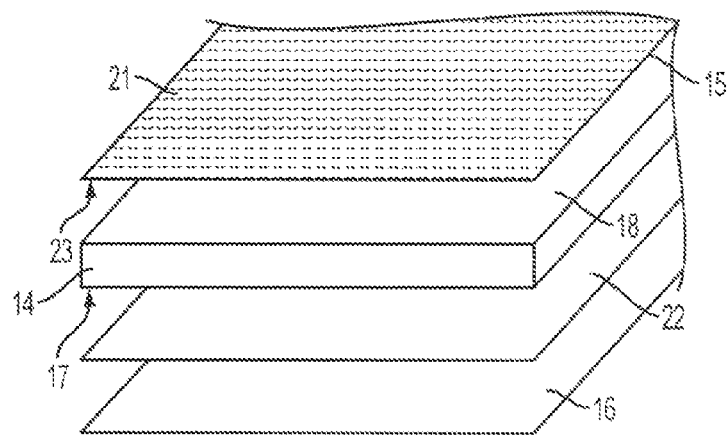
FIG. 2 is an exploded sectional perspective view of a sandwich panel having a radar-absorbing construction and incorporated in the wind turbine blade of FIG. 1.
Figure 3A:
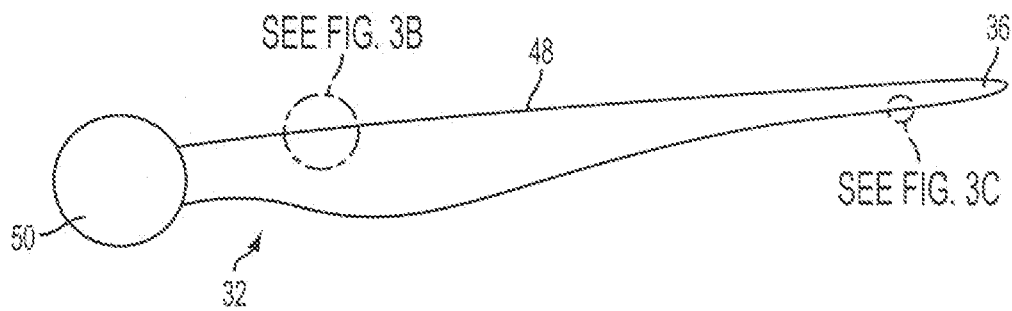
FIG. 3A is a plan view of a wind turbine blade of sandwich panel construction and comprising a split core of the type described in WO2010/122351 and WO2010/122352.
Figure 3B:
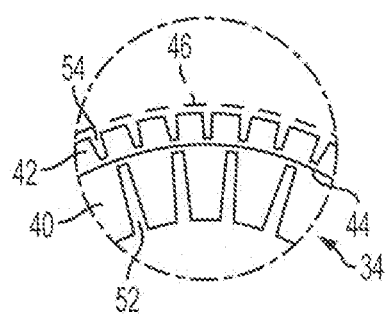
FIG. 3B is an enlarged sectional view of a region close to the root of the blade, at which point the sandwich panel has a relatively thick core.
Figure 3C:
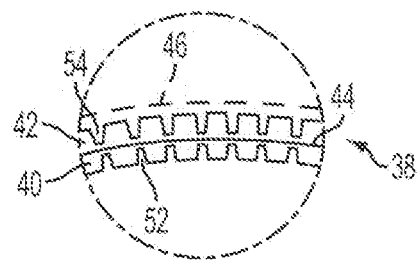
FIG. 3C is an enlarged sectional view of a region close to the tip of the blade, at which point the sandwich panel has a relatively thin core.
Figure 4A:
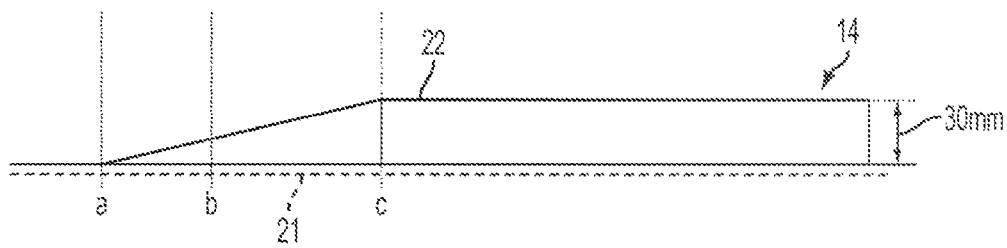
FIG. 4A is a side view of a single core of the type shown in FIG. 2 and having a chamfered edge.
Figure 4B:
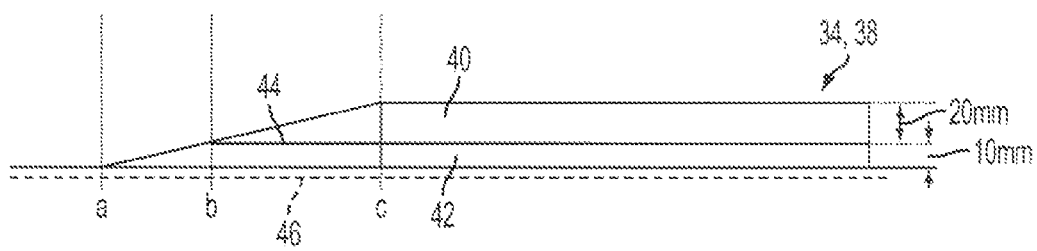
FIG. 4B is a side view of a split core of the type shown in FIGS. 3B and 3C and having a chamfered edge.

It will be appreciated that the benefits of a split core, which were described by way of background with reference to FIG. 3, apply equally to the split cores 60 of the present invention. Hence, a single design of CA layer 68 may be employed irrespective of the total core thickness, because the thickness of the outer core layer 64 may be kept uniform across a composite structure such as a wind turbine blade, with the thickness of the inner core layer 62 varying in accordance with structural requirements. This ensures that the distance between the CA layer 68 and the ground plane 66 is kept constant, whilst allowing the total core thickness to vary in accordance with structural requirements of the blade. In addition, the split-cores 60 of the present invention have increased performance at core chamfers, as described above in relation to FIGS. 4A and 4B.

The term "slit" should not be construed in an unduly limiting way. This term may encompass other drape-promoting formations such as discontinuities, grooves, channels, or slots. The term "radar" here is used for convenience and should be interpreted more generally as relating to microwave radiation.

It will be appreciated that variations or modifications may be made to the specific examples described above without departing from the scope of the present invention as defined by the accompanying claims.

The invention claimed is:

1. A core for a composite structure, the core comprising:
   a first core layer;
   a second core layer; and
   a ground plane between the first and second core layers, the ground plane including a layer of conductive material;
   wherein a plurality of slits is provided in the core, and each slit extends through one of the first or second core layers, through the ground plane, and through less than the entire core.

2. The core of claim 1, wherein each slit extends at least partially through the other of the first or second core layers.

3. The core of claim 1, wherein the ground plane comprises electrically conductive foam.

4. The core of claim 1, wherein the first core layer comprises a dielectric material.

5. The core of claim 1, wherein the first and/or second core layers are made of foam.

6. The core of claim 1, wherein an impedance layer is provided on an outer surface of the core, in spaced apart relation with the ground plane such that the impedance layer and the ground plane form radar absorbing material.

7. A composite structure of sandwich panel construction and comprising a sandwich-panel core as claimed in claim 1.

8. The composite structure of claim 7, comprising an impedance layer spaced-apart from the ground plane.

9. The composite structure of claim 8, wherein the core is arranged within the composite structure such that the first core layer is located between the ground plane and the impedance layer.

10. The composite structure of claim 7, wherein the thickness of the first core layer is substantially uniform across the composite structure.

11. The composite structure of claim 7, wherein the thickness of the second core layer varies across the composite structure to vary the overall thickness of the core.

12. A blade for a wind turbine, the blade comprising the composite structure of claim 7.

13. The wind turbine having a blade according to claim 12, or a wind farm comprising at least one such wind turbine.

14. A core for a composite structure, the core comprising:
    a first core layer;
    a second core layer; and
    a ground plane between the first and second core layers, the ground plane including a layer of carbon;
    wherein a plurality of slits is provided in the core, and each slit extends through one of the first or second core layers and through the ground plane.

15. A composite structure of sandwich panel construction comprising:
    a core comprising a first core layer, a second core layer, and a ground plane between the first and second core layers, the ground plane including a layer of conductive material, a first outer surface facing the first core layer, and a second outer surface facing the second core layer,
    wherein a plurality of slits is provided in the ground plane, each slit extending through less than the entire core, and the first and second outer surfaces are covered by the first and second core layers, respectively.

16. The composite structure of claim 15, wherein each slit extends at least partially through the other of the first or second core layers.

17. The composite structure of claim 15, wherein the ground plane includes a layer of carbon.

18. The composite structure of claim 15, wherein the ground plane comprises electrically conductive foam.

19. The composite structure of claim 15, wherein an impedance layer is provided on an outer surface of the core, in spaced apart relation with the ground plane such that the impedance layer and the ground plane form radar absorbing material.

20. The composite structure of claim 19, wherein the core is arranged within the composite structure such that the core is located between the ground plane and the impedance layer.

21. A method of manufacturing a core for a composite structure, the method comprising:
    bonding a ground plane including a layer of conductive material between first and second core layers to form a unitary split-core structure, and
    forming a plurality of slits in the core so that each slit extends through one of the first or second core layers, through the ground plane, and through less than the entire core.

* * * * *